United States Patent
Huang et al.

(10) Patent No.: US 8,817,001 B2
(45) Date of Patent: Aug. 26, 2014

(54) OPTICAL SENSE-CONTROL SYSTEM HAVING LIGHT FILTERS

(75) Inventors: Hsueh-Ying Huang, Hsin-Chu (TW); Chang-Hung Yang, Hsin-Chu (TW); Pei-Yi Chen, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 242 days.

(21) Appl. No.: 13/285,050

(22) Filed: Oct. 31, 2011

(65) Prior Publication Data

US 2012/0105403 A1 May 3, 2012

(30) Foreign Application Priority Data

Nov. 1, 2010 (TW) ................................ 99137192 A (51) Int. Cl.
*G06F 3/038* (2013.01)
*G06F 3/042* (2006.01)

(52) U.S. Cl.
CPC ..................................... *G06F 3/042* (2013.01)
USPC ........................................................ 345/207

(58) Field of Classification Search
None
See application file for complete search history.

(56) References Cited

U.S. PATENT DOCUMENTS

| | | |
|---|---|---|
| 2004/0189621 A1 | 9/2004 | Cho et al. |
| 2004/0201786 A1 | 10/2004 | Park et al. |
| 2009/0066671 A1 | 3/2009 | Kweon et al. |
| 2009/0073537 A1* | 3/2009 | Taverner ........................ 359/260 |
| 2010/0282953 A1* | 11/2010 | Tam ................................ 250/226 |
| 2011/0109232 A1 | 5/2011 | Schulz et al. |

FOREIGN PATENT DOCUMENTS

| | | |
|---|---|---|
| CN | 101685350 | 3/2010 |
| CN | 101784872 | 7/2010 |
| KR | 100804815 | 2/2008 |

* cited by examiner

*Primary Examiner* — David D Davis
(74) *Attorney, Agent, or Firm* — WPAT, PC; Justin King (57) ABSTRACT

An optical sense-control system, for receiving a first light and second light, includes a first optical filter, a second optical filter, and an optical detection module. The transmission of the first light having a majority intensity in a first wave-length band is greater than the transmission of the second light having a majority intensity in a second wave-length band in the first optical filter, the first wave-length band is less than the second wave-length band, and the transmission of the second light is greater than the transmission of the first light in the second optical filter. The optical detection module is used for creating a first control signal while the first light emitting through the first optical filter at a first zone is detected and a second control signal is created while the second light emitting through the second optical filter at a second zone is detected.

22 Claims, 13 Drawing Sheets

OPTICAL SENSE-CONTROL SYSTEM HAVING LIGHT FILTERS

TECHNICAL FIELD

The disclosure relates to an optical sense-control system, and more particularly to an optical sense-control system having a higher identification ratio to lights with different wavebands.

BACKGROUND

Figure 1:
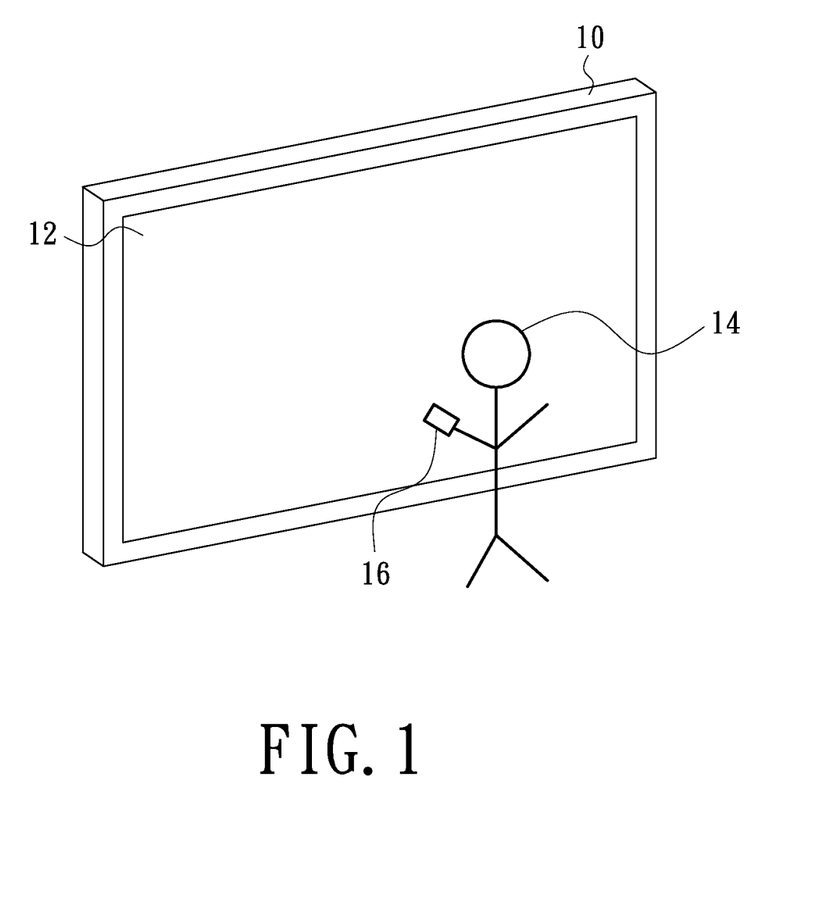
FIG. 1 is a schematic diagram illustrating a user using a conventional optical sense-control system.

A widescreen optical sense-control system, such as an optical touch-panel system, has a wide application such as an electronic whiteboard (E-Board). FIG. 1 is a schematic diagram illustrating a user using a conventional optical sense-control system. As depicted in FIG. 1, the conventional optical sense-control system 10 mainly includes a touch-control panel 12. While the user 14 inputs information on the touch-control panel 12 via a light pen 16, the inputted information is displayed on the touch-control panel 12.

To make the user 14 can use the optical sense-control system 10 more conveniently, the light pen 16 is designed to be capable of emitting lights with different colors and the optical sense-control system 10 can perform a specific response action based on the color of the light received by the optical sense-control system 10. For example, information of a specific color or of that a specific command has been executed may be displayed on the touch-control panel 12 while a corresponding color of light is detected on the touch-control panel 12.

Figure 2:
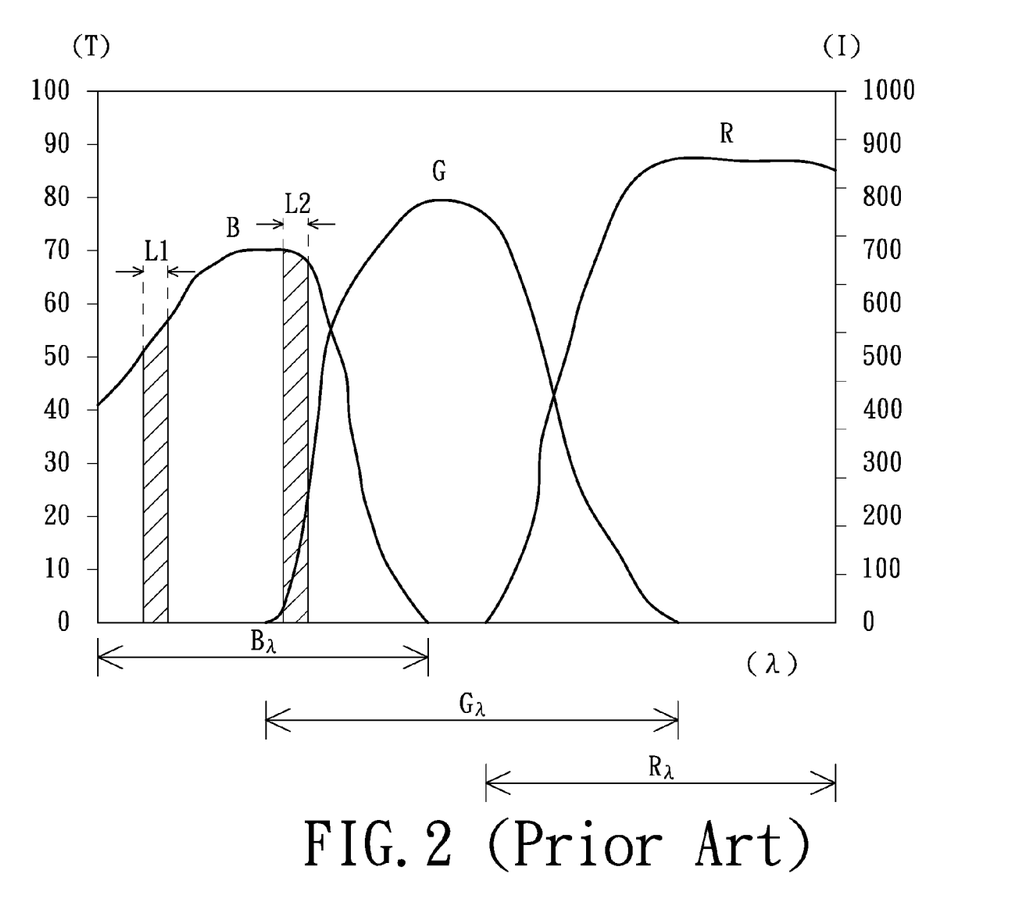
FIG. 2 is a schematic chart illustrating the filtering characteristics of the wavelength, transmission ratio and intensity of a blue-light filter, a green-light filter, and a red-light filter which are adopted in the conventional optical sense-control system.

Different wavelengths have different transmission ratios (or, intensities) to a same optical filter; this can be used for distinguishing the colors of light. FIG. 2 is a schematic chart illustrating the filtering characteristics of the wavelength, transmission ratio and intensity of a blue-light filter, a green-light filter, and a red-light filter which are adopted in the conventional optical sense-control system 10. As depicted in FIG. 2, the blue light B, the green light G, and the red light R are defined with different wavelengths λ and frequencies f, based on the transmission ratios T or intensity I thereof relative to the blue-light filter, the green-light filter, and the red-light filter of the optical sense-control system 10; where the wavelength λ and the frequency f are reciprocal to each other. As depicted in FIG. 2, in the conventional optical sense-control system 10, the blue light B is defined to include the lights with wavelengths within a waveband $B_\lambda$; the green light G is defined to include the lights with wavelengths within a waveband $G_\lambda$, the red light R is defined to include the lights with wavelengths within a waveband $R_\lambda$. Because the blue light B, the green light G, and the red light R are defined in three different specific wavebands in the optical sense-control system 10, a specific response action is accordingly performed while a corresponding light with a specific wavelength, which is emitted from the light pen 16, is detected by the touch-control panel 12. For example, please refer to both FIG. 1 and FIG. 2, a control signal corresponding to the blue light B is created by the optical sense-control system 10 while a light L1 with a wavelength located within the waveband $B_\lambda$, is detected on the touch-control panel 12.

However, as depicted in FIG. 2, there are overlaps between the definitions of the blue light B, the green light G, and the red light R in the conventional optical sense-control system 10. If a specific light with a wavelength which is located in the overlap waveband of any two of the wavebands $B_\lambda$, $G_\lambda$, $R_\lambda$, the conventional optical sense-control system 10 may result in an error detection of the specific light and accordingly perform an error response action. For example, please refer to FIG. 1 and FIG. 2 again, if a light L2, having a wavelength located in both the waveband $B_\lambda$ and the waveband $G_\lambda$, is emitted to the touch-control panel 12 from the light pen 16, the optical sense-control system 10 may create a control signal corresponding to both the blue light B and the green light G due to both the blue-light filter (not shown) and the green-light filter detect the light L2, even though the light L2 had a much higher transmission ratio to the blue-light filter than that to the green-light filter.

BRIEF DESCRIPTION OF THE DRAWINGS

The objects and advantages of the present disclosure will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments are presented herein for purpose of illustration and description only. It is not intended to be exhaustive or to be limited to the precise form disclosed.

Figure 3:
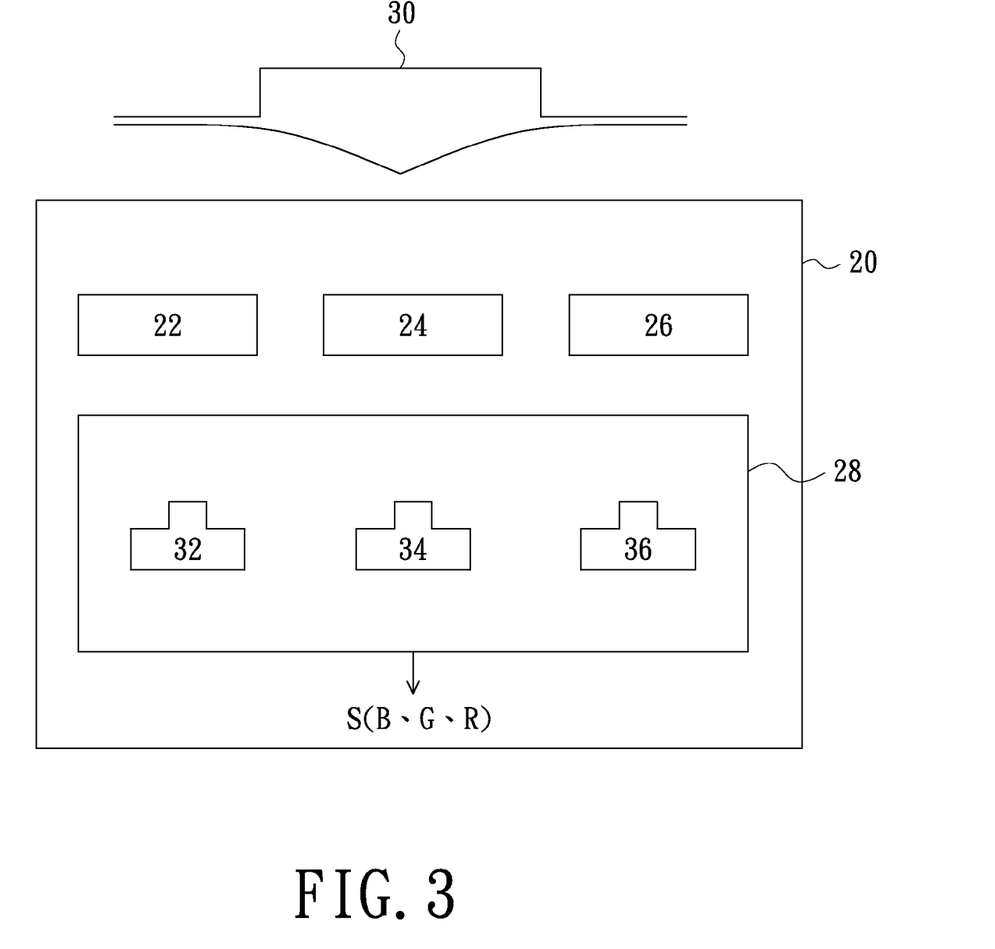
FIG. 3 schematically illustrates one of the optical sense-control units adopted in an optical sense-control system of the present embodiment.

FIG. 3 schematically illustrates one of the optical sense-control units adopted in an optical sense-control system of the present embodiment; wherein the optical sense-control system of the present embodiment includes n*m optical sense-control units. As depicted in FIG. 3, the optical sense-control unit 20, arranged in the optical sense-control system of the present embodiment, includes a blue-light filter 22, a green-light filter 24, a red-light filter 26, and an optical sense device array 28. In the optical sense-control unit 20, the lights corresponding to a specific waveband $B_\lambda$ and capable of passing through the blue-light filter 22, is defined as blue light B; the lights corresponding to a specific waveband $G_\lambda$ and capable of passing through the green-light filter 24, is defined as green light G; and the light corresponding to a specific waveband $R_\lambda$ and capable of passing through the red-light filter 26, is defined as red light R; wherein the blue light B, the green light G, and the red light R are emitted from a light pen (not shown), $B_\lambda < G_\lambda < R_\lambda$, and there is no overlap between the wavebands $B_\lambda$, $G_\lambda$, and $R_\lambda$. In other words, the blue-light filter 22 has a filtering characteristic of having a higher transmission ratio to the blue light B rather than that to the green G light and the red R light; the green-light filter 24 has a filtering characteristic of having a higher transmission ratio to the green light G rather than that to the blue light B and the red light R; the red-light filter 26 has a filtering characteristic of having a higher transmission ratio to the red light R rather than that to the blue light B and the green light G; wherein the intensity of the blue light B is concentrated in the range of waveband $B_\lambda$, the intensity of the green light G is concentrated in the range of waveband $G_\lambda$, and the intensity of the red light R is concentrated in the range of waveband $R_\lambda$, as mentioned above.

Moreover, as depicted in FIG. 3, the optical sense device array 28 includes a blue-light sensor 32, a green-light sensor 34, and a red-light sensor 36, respectively used for detecting the intensity of the lights 30 capable of passing through the blue-light filter 22, the green-light filter 24, and the red-light filter 26. Alternatively, the blue-light sensor 32, the green-light sensor 34, and the red-light sensor 36 can be also three corresponding optical sensing zones. Moreover, a specific control signal S(B, G, R) is created and outputted from the optical sense device array 28 according to the intensity of the lights 30 detected by the blue-light sensor 32, the green-light sensor 34, and the red-light sensor 36.

For example, a first control signal (i.e., S(B, G, R)=S(1, 0, 0)), corresponding to the blue light B, is created and outputted from the optical sense device array 28 if only the blue-light sensor 32 detects the intensity of the lights 30 which is capable of passing through the blue-light filter 22; a second control signal (i.e., S(B, G, R)=S(0, 1, 0)), corresponding to the green light G, is created and outputted from the optical sense device array 28 if only the green-light sensor 34 detects the intensity of the light 30 which is capable of passing through the green-light filter 24; and a third control signal (i.e., S(B, G, R)=S(0, 0, 1)), corresponding to the red light R, is created and outputted from the optical sense device array 28 if only the red-light sensor 36 detects the intensity of the light 30 which is capable of passing through the red-light filter 26.

Instead of being composed by a single color light which is emitted from a single light source, it is to be understood that the lights 30 can be composed by multiple color lights which are emitted from multiple light sources. Therefore, a fourth control signal (i.e., S(B, G, R)=S(1, 1, 0)), corresponding to the blue light B and the green light G, is created and outputted from the optical sense device array 28 if both the blue-light sensor 32 and the green-light sensor 34 detect the intensity of the lights 30 capable of passing through the blue-light filter 22 and the green-light filter 24; a fifth control signal (i.e., S(B, G, R)=S(0, 1, 1)), corresponding to the green light G and the red light R, is created and outputted from the optical sense device array 28 if both the green-light sensor 34 and the red-light sensor 36 detect the intensity of the lights 30 capable of passing through the green-light filter 24 and the red-light filter 26; a sixth control signal (i.e., S(B, G, R)=S(1, 0, 1)), corresponding to the blue light B and the red light R, is created and outputted from the optical sense device array 28 if both the blue-light sensor 32 and the red-light sensor 36 detect the intensity of the lights 30 capable of passing through the blue-light filter 22 and the red-light filter 26; and a seventh control signal (i.e., S(B, G, R)=S(1, 1, 1)), corresponding to the blue light B, the green light G, and the red light R, is created and outputted from the optical sense device array 28 if all the blue-light sensor 32, the green-light sensor 34, and the red-light sensor 36 detect the intensity of the lights 30 capable of passing through the blue-light filter 22, the green-light filter 24, and the red-light filter 26. Moreover, it is to be understood that the lights 30 can be emitted from a single light pen which is capable of emitting a single color light or emitting multiple color lights; or, the lights 30 composed by multiple color lights can be emitted from multiple light pens each emitting a single color light.

Figure 4A:
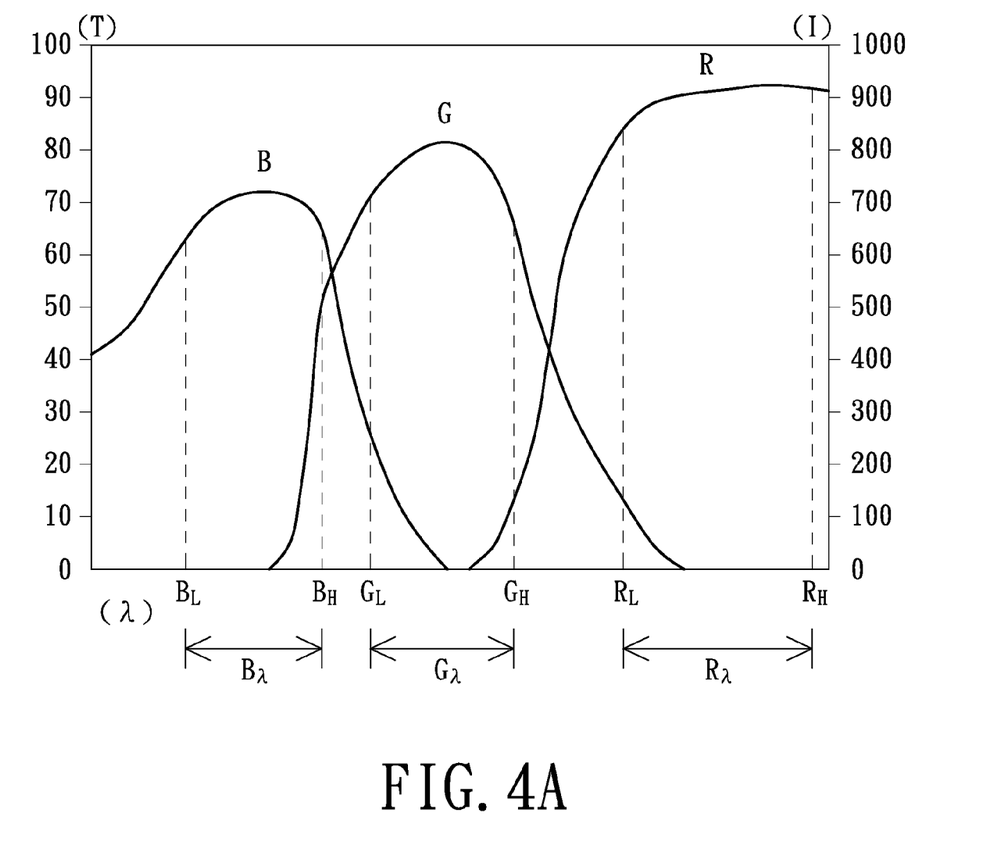
FIG. 4A is a schematic chart illustrating the filtering characteristics of the blue-light filter, the green-light filter, and the red-light filter to the wavelength, transmission ratio and intensity of the lights, according to the first embodiment.
Figure 4B:
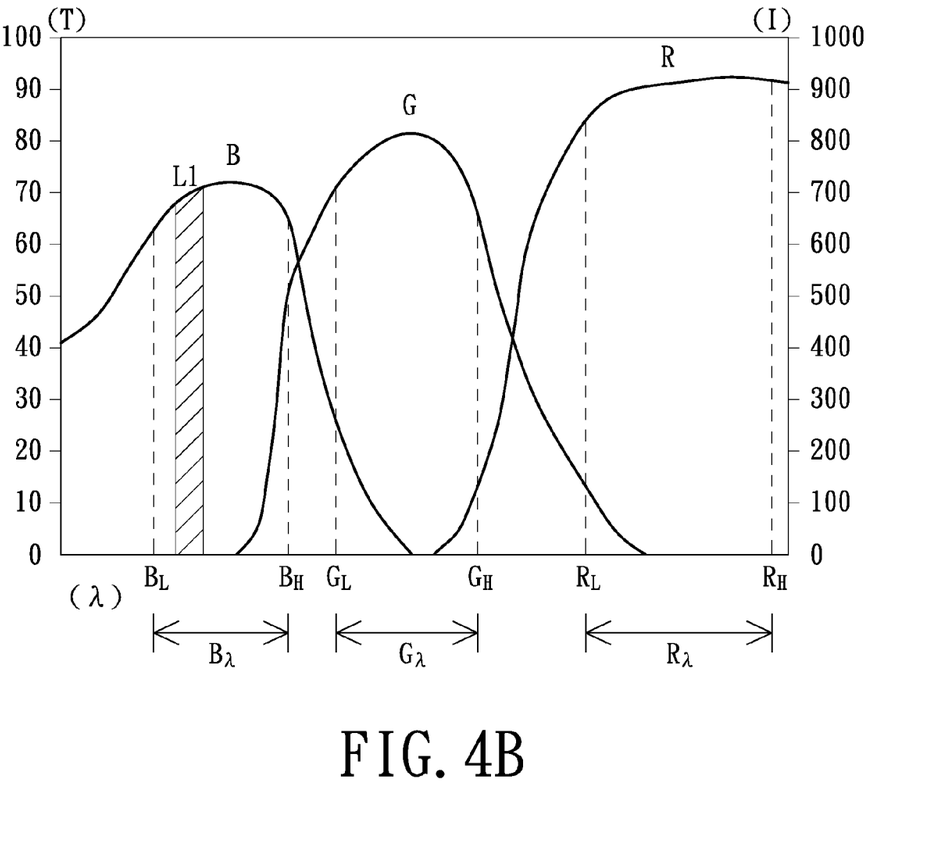
FIG. 4B is a schematic chart illustrating an example of lights in the wavelength/transmission ratio/intensity defined by the blue-light filter, the green-light filter, and the red-light filter which are adopted in the first embodiment.
Figure 4C:
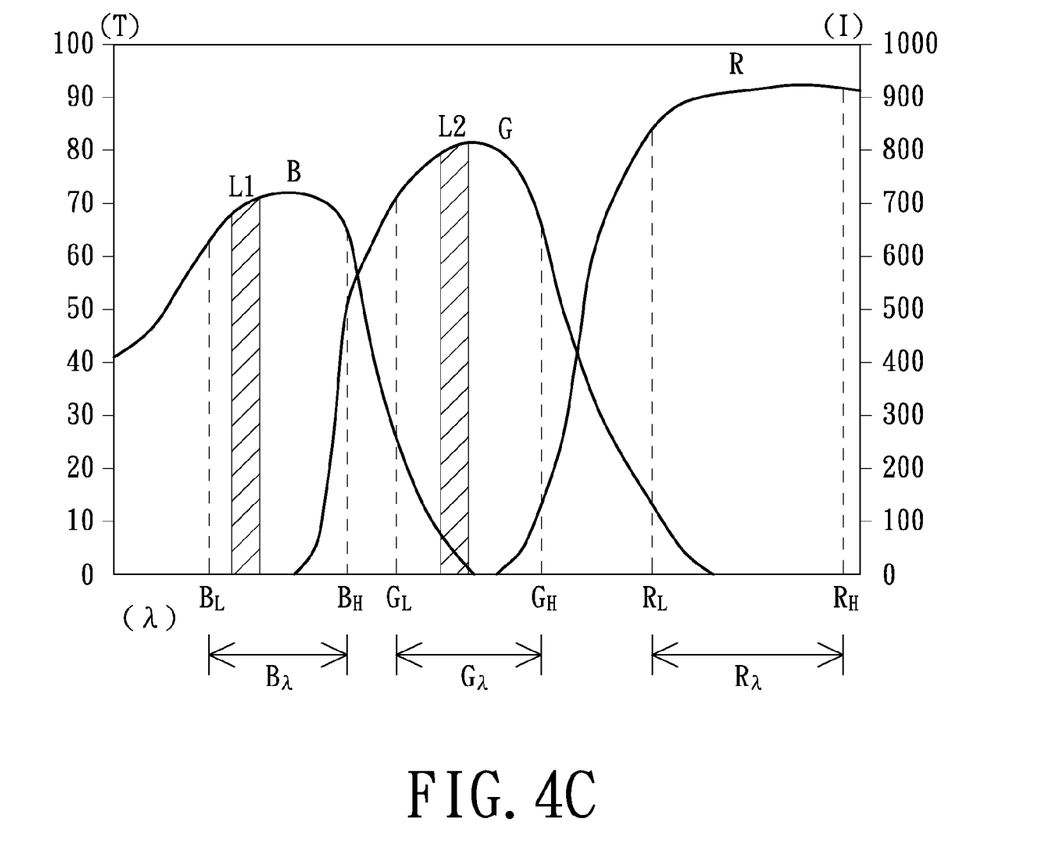
FIG. 4C is a schematic chart illustrating an example of lights in the wavelength/transmission ratio/intensity defined by the blue-light filter, the green-light filter, and the red-light filter which are adopted in the first embodiment.

FIG. 4A is a schematic chart illustrating the filtering characteristics of the blue-light filter 22, the green-light filter 24, and the red-light filter 26 to the wavelength, transmission ratio and intensity of the lights, according to the first embodiment of the present invention. As depicted in FIG. 4A, the waveband $B_\lambda$ of the blue light B is defined in the first embodiment as a range of wavelengths $B_L \sim B_H$ which correspond to the highest intensity of the lights capable of passing through the blue-light filter 22; the waveband $G_\lambda$ of the green light G is defined as a range of $G_L \sim G_H$ which correspond to the highest intensity of the lights capable of passing through the green-light filter 24; the waveband $R_\lambda$ of the red light R is defined as a range of $R_L \sim R_H$ which correspond to the highest intensity of the lights capable of passing through the red-light filter 26. In the first embodiment, a specific control signal S(B, G, R) is outputted from the optical sense device array 28 while wavelengths within a corresponding waveband is detected. For example, please refer to both the FIG. 3 and FIG. 4B, if the lights 30 are composed by a single light L1 whose waveband is within the range of $B_L \sim B_H$, the lights 30 can only pass through the blue-light filter 22 so that only the blue-light sensor 32 can detect the intensity of the lights 30, thereby a first control signal (i.e., S(B, G, R)=S(1, 0, 0)) corresponding to the blue light B is created and outputted from the optical sense device array 28. Please refer to both the FIG. 3 and FIG. 4C, if the lights 30 are composed by two lights L1 and L2, wherein the waveband of the light L1 is within the range of $B_L \sim B_H$ and the waveband of the light L2 is within the range of $G_L \sim G_H$, the lights 30 can pass through both the blue-light filter 22 and the green-light filter 24 so that the blue-light sensor 32 can detect the intensity of light L1 and the green-light sensor 34 can detect the intensity of light L2, thereby a fourth control signal (i.e., S(B, G, R)=S(1, 1, 0)) corresponding to the blue light B and the green light G is created and outputted from the optical sense device array 28.

Figure 5A:
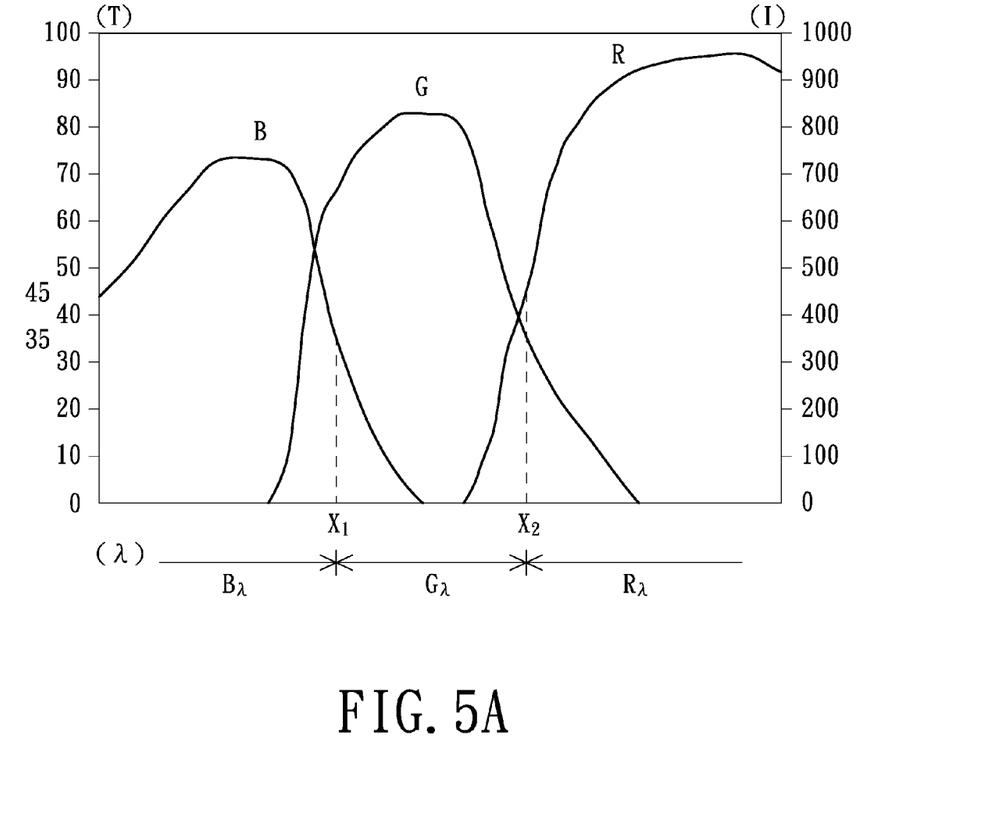
FIG. 5A is a schematic chart illustrating the filtering characteristics of the blue-light filter, the green-light filter, and the red-light filter to the wavelength, transmission ratio and intensity of the lights, according to the second embodiment.
Figure 5B:
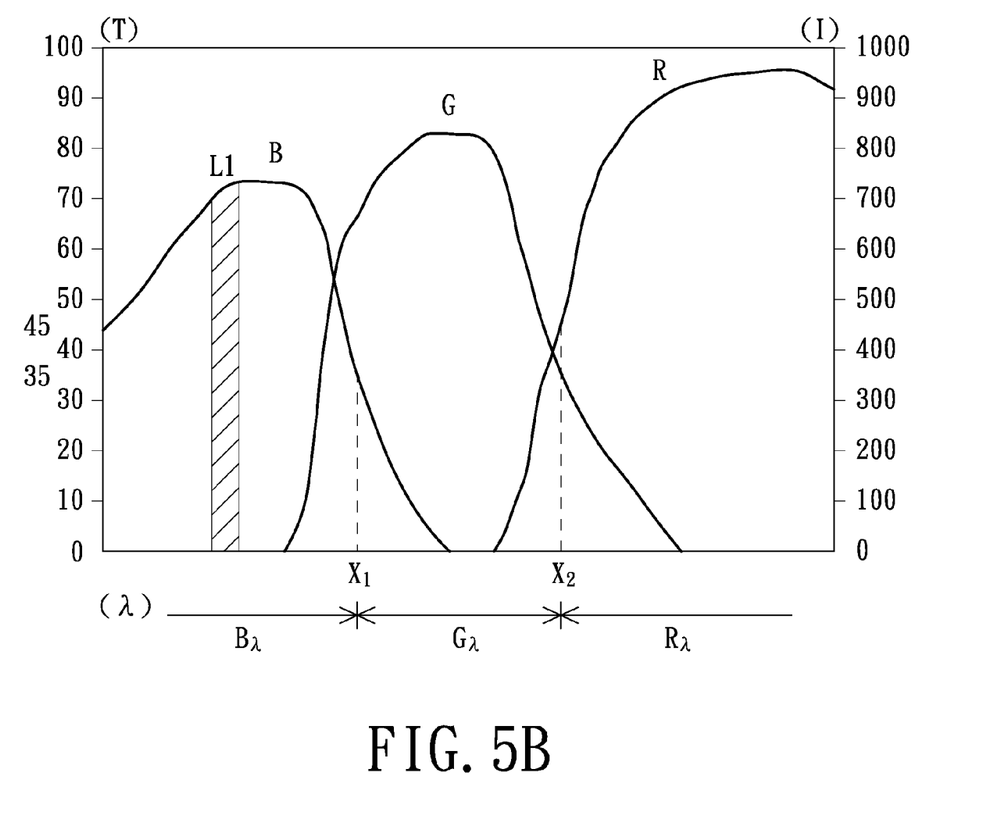
FIG. 5B is a schematic chart illustrating an example of lights in the wavelength/transmission ratio/intensity defined by the blue-light filter, the green-light filter, and the red-light filter which are adopted in the second embodiment.
Figure 5C:
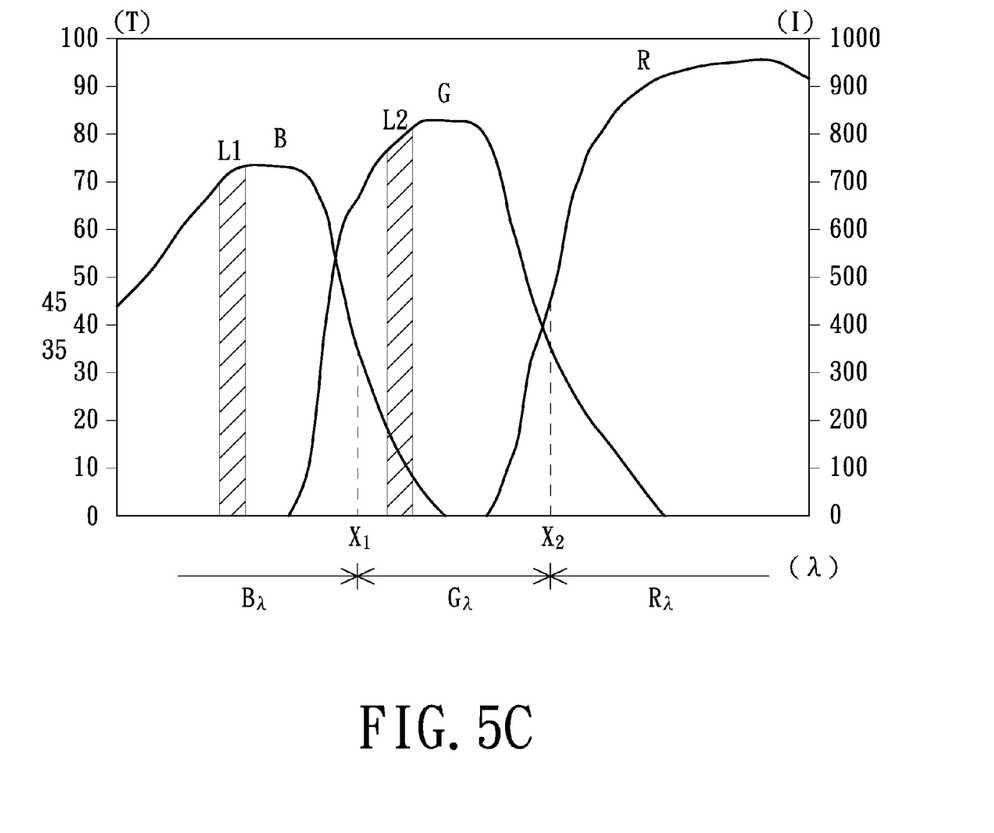
FIG. 5C is a schematic chart illustrating an example of lights in the wavelength/transmission ratio/intensity defined by the blue-light filter, the green-light filter, and the red-light filter which are adopted in the second embodiment.

FIG. 5A is a schematic chart illustrating the filtering characteristics of the blue-light filter 22, the green-light filter 24, and the red-light filter 26 to the wavelength, transmission ratio and intensity of the lights, according to the second embodiment of the present invention. As depicted in FIG. 5A, the waveband $G_\lambda$ of the green light G is defined in the second embodiment between wavelengths $X_1$~$X_2$, wherein the wavelength $X_1$ corresponds to the 50% of the maximum intensity of the lights capable of passing through the blue-light filter 22, and the wavelength $X_2$ corresponds to the 50% of the maximum intensity of the lights capable of passing through the red-light filter 26. Therefore, as depicted in FIG. 5A, the wavelength $X_1$ corresponds to 50% of the maximum transmission ratio (or full-width-at-half-maximum) of the blue-light filter 22, that is, the wavelength $X_1$ corresponds to the transmission ratio of 35% due to the maximum transmission ratio of the blue-light filter 22 is about 70%; and the wavelength $X_2$ corresponds to 50% of the maximum transmission ratio of the blue-light filter 22, that is, the wavelength $X_2$ corresponds to the transmission ratio of 45% due to the maximum transmission ratio of the red-light filter 26 is about 90%. Accordingly, the blue light B defined in the second embodiment has a waveband $B_\lambda$ with wavelengths thereof less than $X_1$, and the red light R defined in the second embodiment has a waveband $R_\lambda$ with wavelengths thereof greater than $X_2$. In the second embodiment, a specific control signal S(B, G, R) is outputted from the optical sense device array 28 while wavelengths within a corresponding waveband is detected. For example, please refer to both the FIG. 3 and FIG. 5B, if the lights 30 are composed by a single light L1 whose wavelength is less than $X_1$, the lights 30 can only pass through the blue-light filter 22 so that only the blue-light sensor 32 can detect the intensity of the lights 30, thereby a first control signal (i.e., S(B, G, R)=S(1, 0, 0)) corresponding to the blue light B is created and outputted from the optical sense device array 28. Please refer to both the FIG. 3 and FIG. 5C, if the lights 30 are composed by two lights L1 and L2, wherein the wavelength of the light L1 is less than $X_1$ and the wavelength of the light L2 is within the range of $X_1$~$X_2$, the lights 30 can pass through both the blue-light filter 22 and the green-light filter 24 so that the blue-light sensor 32 can detect the intensity of light L1 and the green-light sensor 34 can detect the intensity of light L2, thereby a fourth control signal (i.e., S(B, G, R)=S(1, 1, 0)) corresponding to the blue light B and the green light G is created and outputted from the optical sense device array 28.

It is to be understood that the second embodiment needs not be limited to set the wavelength $X_1$ to correspond to 50% of the maximum transmission ratio of the lights capable of passing through the blue-light filter 22, and not be limited to set the wavelength $X_2$ to correspond to 50% of the maximum transmission ratio of the lights capable of passing through the red-light filter 26. The wavelength $X_1$ can be set to correspond to other ratio of the maximum transmission ratio of the blue-light filter 22, such as 30%, and the wavelength $X_2$ can also be set to correspond to other ratio of the maximum transmission ratio of the red-light filter 26, such as 30%. However, the ratio 50% has a better practice than the ratio 30% has.

Figure 6A:
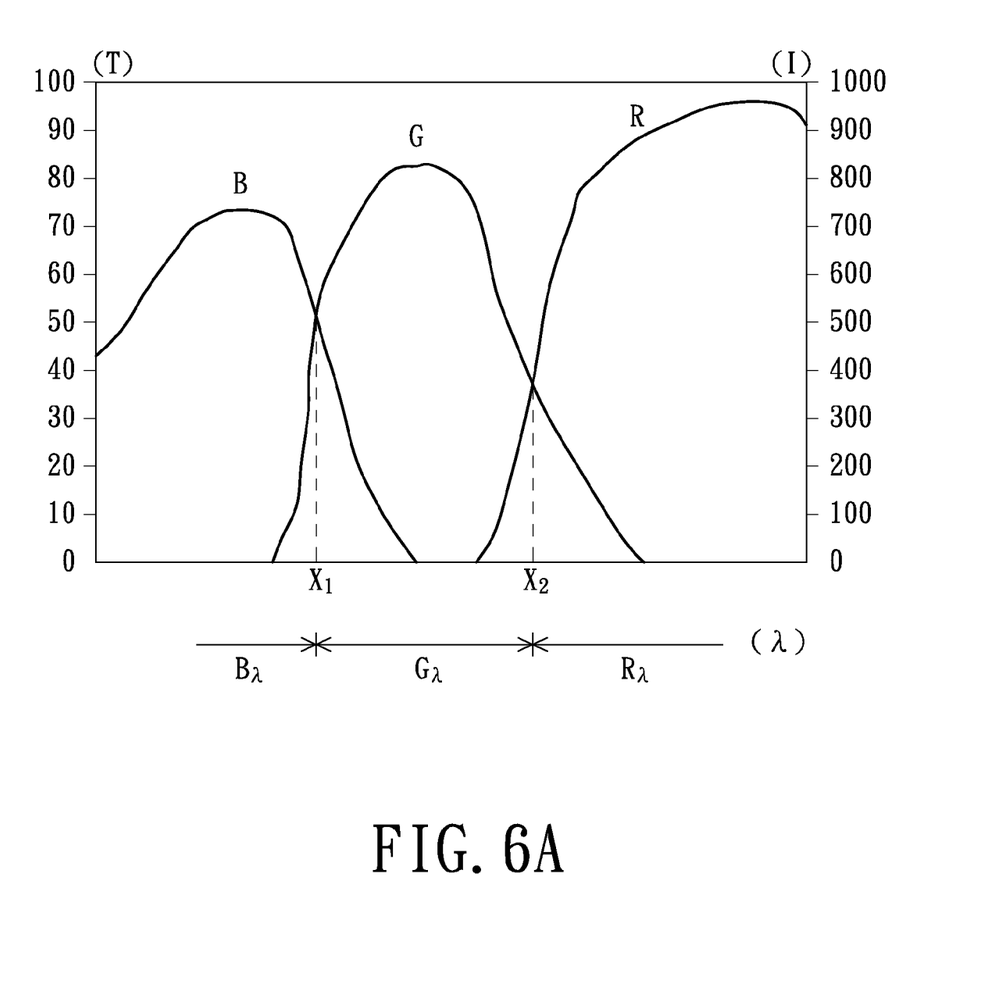
FIG. 6A is a schematic chart illustrating the filtering characteristics of the blue-light filter, the green-light filter, and the red-light filter to the wavelength, transmission ratio and intensity of the lights, according to the third embodiment.
Figure 6B:
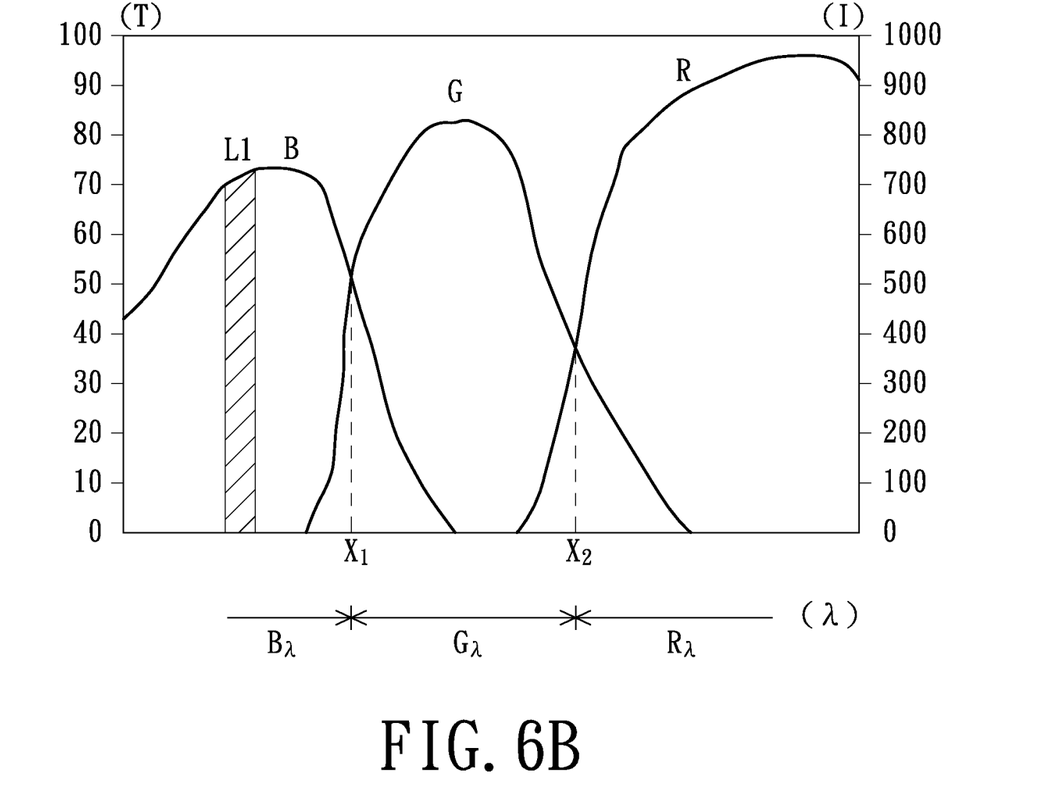
FIG. 6B is a schematic chart illustrating an example of lights in the wavelength/transmission ratio/intensity defined by the blue-light filter, the green-light filter, and the red-light filter which are adopted in the third embodiment.
Figure 6C:
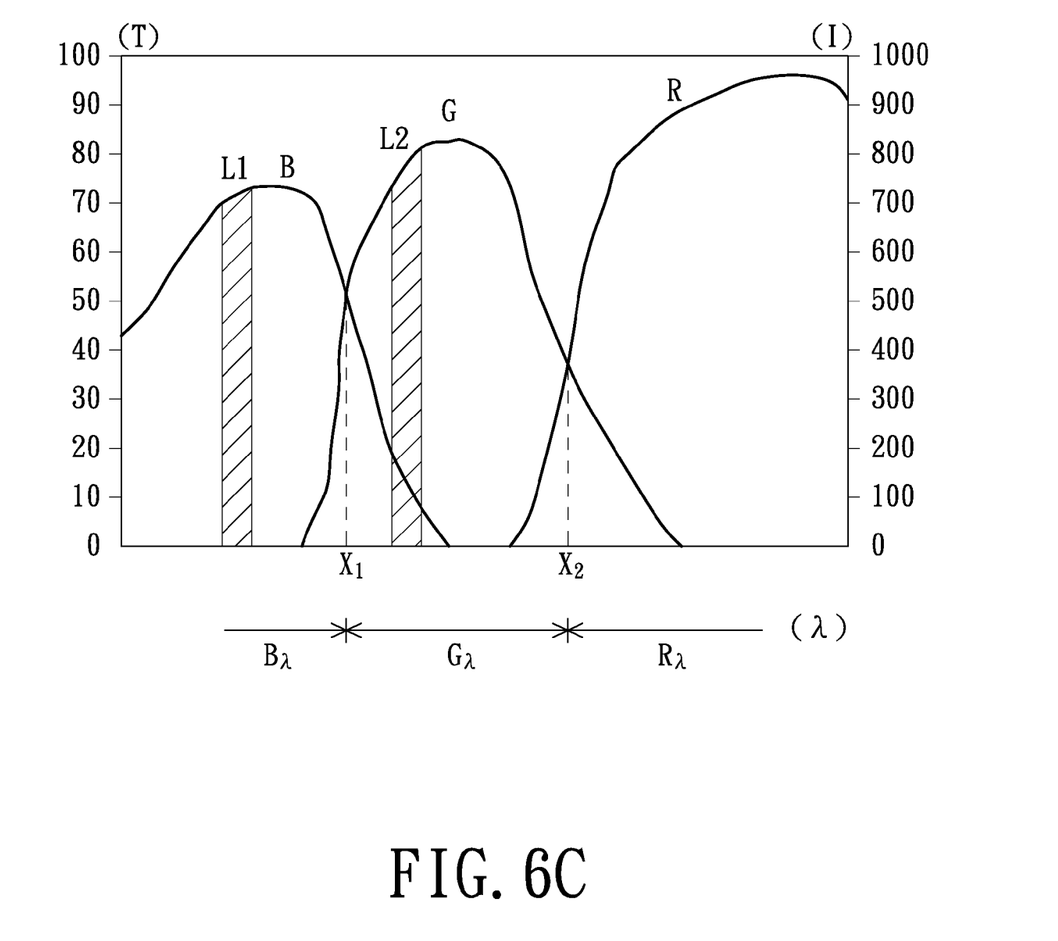
FIG. 6C is a schematic chart illustrating an example of lights in the wavelength/transmission ratio/intensity defined by the blue-light filter, the green-light filter, and the red-light filter which are adopted in the third embodiment.

FIG. 6A is a schematic chart illustrating the filtering characteristics of the blue-light filter 22, the green-light filter 24, and the red-light filter 26 to the wavelength, transmission ratio and intensity of the lights, according to the third embodiment of the present invention. As depicted in FIG. 6A, the waveband $G_\lambda$ of the green light G defined in the third embodiment is between wavelengths $X_1$~$X_2$; wherein the wavelength $X_1$ corresponds to a junction where the blue-light filter 22 and the green-light filter 24 have a same transmission ratio to a same light, and the wavelength $X_2$ corresponds to a junction where the green-light filter 24 and the red-light filter 26 have a same transmission ratio to a same light. Accordingly, the blue light B defined in the third embodiment has a waveband $B_\lambda$ with wavelengths thereof less than $X_1$, and the red light R defined in the third embodiment has a waveband $R_\lambda$ with wavelengths thereof greater than $X_2$. In the third embodiment, a specific control signal S(B, G, R) is outputted from the optical sense device array 28 while wavelengths within a corresponding waveband is detected. For example, please refer to both the FIG. 3 and FIG. 6B, if the lights 30 are composed by a single light L1 whose wavelength is less than $X_1$, the lights 30 can only pass through the blue-light filter 22 so that only the blue-light sensor 32 can detect the intensity of the lights 30, thereby a first control signal (i.e., S(B, G, R)=S (1, 0, 0)) corresponding to the blue light B is created and outputted from the optical sense device array 28. Please refer to both the FIG. 3 and FIG. 6C, if the lights 30 are composed by two lights L1 and L2, wherein the wavelength of the light L1 is less than $X_1$ and the wavelength of the light L2 is within the range of $X_1$~$X_2$, the lights 30 can pass through both the blue-light filter 22 and the green-light filter 24 so that the blue-light sensor 32 can detect the intensity of light L1 and the green-light sensor 34 can detect the intensity of light L2, thereby a fourth control signal (i.e., S(B, G, R)=S(1, 1, 0)) corresponding to the blue light B and the green light G is created and outputted from the optical sense device array 28.

Based on the characteristics of the present invention, a first control signal is created by the optical sense device array 28 if a first light is detected in a first optical sensing zone of the optical sense device array 28; a second control signal is created by the optical sense device array 28 if a second light is detected in a second optical sensing zone of the optical sense device array 28; accordingly, a $n_{th}$ control signal is created by the optical sense device array 28 if a $n_{th}$ light is detected in a $n_{th}$ optical sensing zone of the optical sense device array 28.

Summarily, the identification rate to distinguish the blue, green, and red lights with different wavebands is accordingly increasing, by the blue-light filter 22, the green-light filter 24, and the red-light filter 26 in the optical sense-control system of the present invention.

Moreover, the definition approach to distinguish the blue light (waveband $B_\lambda$), the green light (waveband $G_\lambda$), and the red light (waveband $R_\lambda$) using the blue-light filter 22, the green-light filter 24, and the red-light filter 26 in the embodiments can be mutually combined. For example, the green light G can be defined as the lights having a waveband $G_\lambda$ with a range of $X_1$~$X_2$, wherein the wavelength $X_1$ corresponds to a junction where the blue-light filter 22 and the green-light filter 24 have a same transmission ratio of a same light, and the wavelength $X_2$ corresponds to 50% of the maximum intensity of the lights capable of passing through the red-light filter 26. Accordingly, the blue light G is defined as the lights having wavelengths less than $X_1$ and the red light R is defined as the lights having wavelength greater than $X_2$.

Figure 4D:
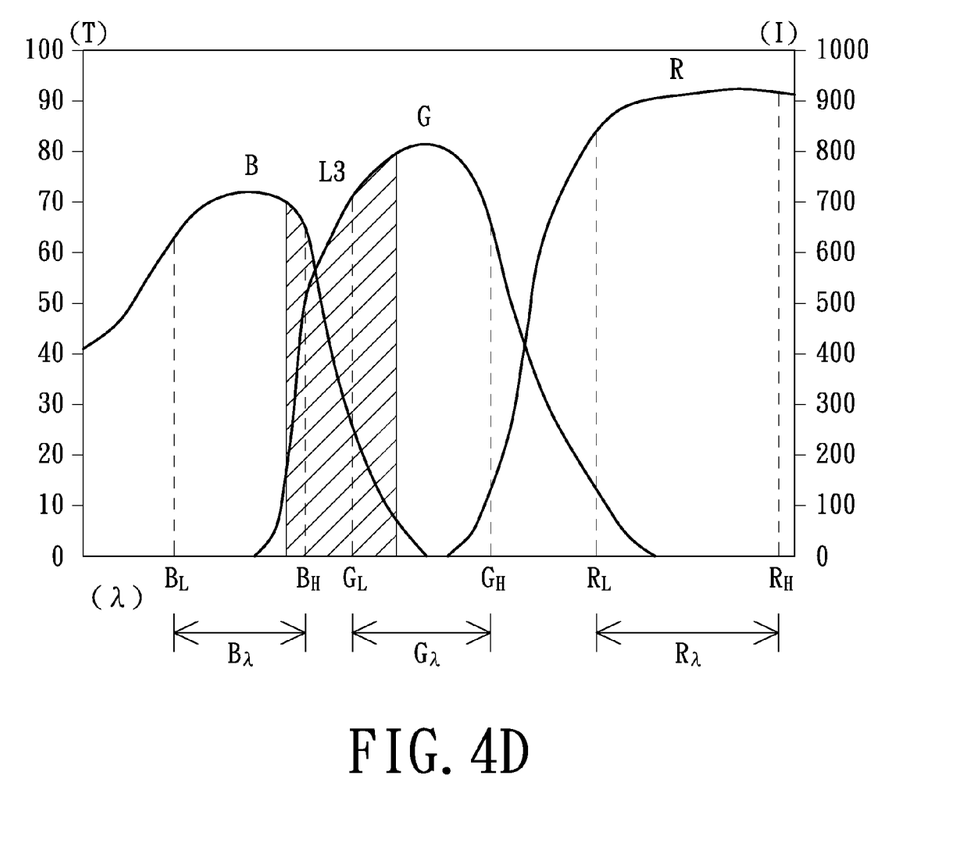
FIG. 4D is a schematic chart illustrating an example of lights in the wavelength/transmission ratio/intensity defined by the blue-light filter, the green-light filter, and the red-light filter which are adopted in the first embodiment.

Moreover, the embodiments of the present invention can be also applied to color-mixed lights which have wavelengths crossing more than one wavebands. For example, please refer to both the FIG. 3 and FIG. 4D, if the lights 30 are composed by color-mixed lights L3 whose wavelengths are crossing $B_H$~$G_L$, the lights 30 can pass through both the blue-light filter 22 and the green-light filter 24 so that both the blue-light sensor 32 and the green-light sensor 34 detect the intensity of the lights 30, thereby a fourth control signal (i.e., S(B, G, R)=S(1, 1, 0)) corresponding to the blue light B and the green light G is created and outputted from the optical sense device array 28.

Moreover, it is to be understood that the embodiments need not be limited to adopt the three blue-light sensor 32, the green-light sensor 34, and the red-light sensor 36 for detecting the intensity of lights capable of passing through the blue-light filter 22, the green-light filter 24, and the red-light filter 26, respectively. The embodiments can also adopt a single optical sensing device for detecting the intensity of the blue light, the green light, and the red light.

Moreover, it is to be understood that the embodiments need not be limited to adopt the blue-light filter 22, the green-light filter 24, and the red-light filter 26 for detecting the intensity of the blue light, the green light, and the red light, respectively. The concept of the embodiments can also be applied to other primary-color filters, such as the RGBC, RGBCY, RGBW filters.

Moreover, it is to be understood that the concept of the embodiments can also be applied to Color Filter on Array (COA) technology, or the RGBC, the RGBCY, and the RGBW touch-control panels. Moreover, the n-color touch panel in the embodiments can have n optical sensing zones, or multiple colors can be detected in a single optical sensing zone.

While the embodiment has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical sense-control system, comprising:
   a first-light filter having a filtering characteristic of allowing first lights to pass through, wherein the major intensity of the first lights is concentrated in a first waveband;
   a second-light filter having a filtering characteristic of allowing second lights to pass through, wherein the major intensity of the second lights is concentrated in a second waveband;
   the transmission ratio of the first lights to the first-light filter in the first waveband is greater than the transmission ratio of the first lights to the second-light filter in the second waveband;
   the transmission ratio of the second lights to the second-light filter in the second waveband is greater than the transmission ratio of the second lights to the first-light filter in the first waveband; and
   an optical sense device array at least comprising a first-light sensing device and a second-light sensing device, wherein a first control signal is outputted from the optical sense device array while the first lights, passed through the first-light filter, is detected in a first zone by the first-light sensing device, a second control signal is outputted from the optical sense device array while the second light, passed through the second-light filter, is detected in a second zone by the second-light sensing device; wherein the position of the first-light sensing device corresponds to the position of the first-light filter and the first zone is defined by the position of the first-light filter, the position of the second-light sensing device corresponds to the position of the second-light filter and the second zone is defined by the position of the second-light filter.

2. The optical sense-control system according to claim 1, wherein a main value of the first waveband is defined as a wavelength of a corresponding first light with the highest intensity in the first light, a main value of the second waveband is defined as a wavelength of a corresponding second light with the highest intensity.

3. The optical sense-control system according to claim 1, wherein the first waveband is defined as a range of wavelengths corresponding to transmission ratios equal to or greater than 50% of the maximum transmission ratio of the lights capable of passing through the first-light filter, and the second waveband is defined as a range of wavelengths corresponding to transmission ratios equal to or greater than 50% of the maximum transmission ratio of the lights capable of passing through the second-light filter.

4. The optical sense-control system according to claim 1, wherein the first waveband is defined as a range of wavelengths corresponding to transmission ratios equal to or greater than 30% of the maximum transmission ratio of the lights capable of passing through the first-light filter, and the second waveband is defined as a range of wavelengths corresponding to transmission ratios equal to or greater than 30% of the maximum transmission ratio of the lights capable of passing through the second-light filter.

5. The optical sense-control system according to claim 1, wherein a wavelength, corresponding to a first junction where the first-light filter and the second-light filter have a same transmission ratio, is greater than the first waveband but less than the second waveband.

6. The optical sense-control system according to claim 1, wherein a wavelength, corresponding to 50% of the maximum transmission ratio of the lights capable of passing through the first-light filter, is greater than the first waveband but less than the second waveband.

7. The optical sense-control system according to claim 1, wherein the first waveband is defined as a range of wavelengths corresponding to transmission ratios equal to or greater than 50% of the maximum transmission ratio of the first-light filter, and a full-width-at-half-maximum waveband of the first light is located in the first waveband; the second waveband is defined in a range of wavelengths corresponding to transmission ratios equal to or greater than 50% of the maximum transmission ratio of the lights capable of passing through the second-light filter, and a full-width-at-half-maximum waveband of the second light is located in the second waveband.

8. The optical sense-control system according to claim 1, wherein a third control signal is outputted from the optical sense device array while the first light and the second light are detected in both the first zone and the second zone by the first-light sensing device and second-light sensing device.

9. The optical sense-control system according to claim 1, wherein the first-light filter is a blue-light filter, a green-light filter, or a red-light filter.

10. The optical sense-control system according to claim 1 further comprising a third-light filter having a filtering characteristic of allowing third lights to pass through, wherein the major intensity of the third lights is concentrated in a third waveband, the transmission ratio of the third lights to the third-light filter in the third waveband is greater than the transmission ratios of the first and the second lights to the third-light filter in the third waveband, and a third zone is defined in the third-light sensing device array according to the position of the third-light filter.

11. The optical sense-control system according to claim 10, wherein a main value of the first waveband is defined as a wavelength of a corresponding first light with the highest intensity, the main value of the second waveband is defined as a wavelength of a corresponding second light with the highest intensity, a main value of the third waveband is defined as a wavelength of a corresponding third light with the highest intensity.

12. The optical sense-control system according to claim 10, wherein the first waveband is defined as a range of wavelengths corresponding to transmission ratios equal to or greater than 50% of the maximum transmission ratio of the lights capable of passing through the first-light filter, the second waveband is defined as a range of wavelengths corresponding to transmission ratios equal to or greater than 50% of the maximum transmission ratio of the lights capable of passing through the second-light filter, and the third waveband is defined as a range of wavelengths corresponding to transmission ratios equal to or greater than 50% of the maximum transmission ratio of the lights capable of passing through the third-light filter.

13. The optical sense-control system according to claim 10, wherein a first wavelength, corresponding to a first junction where the first-light filter and the second-light filter have a same transmission ratio to a same light, is greater than the first waveband but less than the second waveband, and a second wavelength, corresponding to a second junction where the second-light filter and the third-light filter have a same transmission ratio to a same light, is greater than the second waveband but less than the third waveband.

14. The optical sense-control system according to claim 10, wherein a first wavelength, corresponding to 50% of the maximum transmission ratio of the lights capable of passing through the first-light filter, is greater than the first waveband but less than the second waveband, a second wavelength, corresponding to 50% of the maximum transmission ratio of the lights capable of passing through the third-light filter, is greater than the second waveband but less than the third waveband.

15. The optical sense-control system according to claim 10, wherein a full-width-at-half-maximum waveband of the first light is located in the first waveband; a full-width-at-half-maximum waveband of the second light is located in the second waveband; a full-width-at-half-maximum waveband of the third light is located in third waveband.

16. The optical sense-control system according to claim 10, wherein a fourth control signal is outputted from the third-light sensing device array while the third light is detected in the third zone.

17. The optical sense-control system according to claim 10, wherein a third control signal is outputted from the first-light and second-light sensing device array while the first light and the second light are detected in both the first zone and the second zone, a fifth control signal is outputted from the first-light and third-light sensing device array while the first light and the third light are detected in both the first zone and the third zone, a sixth control signal is outputted from the second-light and third-light sensing device array while the second light and the third light are detected in both the second zone and the third zone, and a seventh control signal is outputted from the first-light, second-light and third-light sensing device array while the first light, the second light, and the third light are detected in all the first zone, the second zone, and the third zone.

18. An optical sense-control system, comprising:
a light source device for emitting first lights, wherein the major intensity of the first lights is concentrated in a first waveband;
a first-light filter having a filtering characteristic of allowing the first lights to pass through, wherein the transmission ratio of the first lights to the first-light filter is higher than a threshold;
a second-light filter having a filtering characteristic of allowing the first lights to pass through, wherein the transmission ratio of the first lights to the second-light filter is higher than the threshold; and
an optical sense device array at least comprising a first-light sensing device and a second-light sensing device, wherein a first control signal is outputted from the first-light and the second-light sensing device sense the first light at the same time, while the first lights, passed through the first-light filter, is detected in a first zone by the first-light sensing device, and passed through the second-light filter, is detected in a second zone by the second-light sensing device; wherein the position of the first-light sensing device corresponds to the position of the first-light filter and the first zone is defined by the position of the first-light filter, the position of the second-light sensing device corresponds to the position of the second-light filter and the second zone is defined by the position of the second-light filter.

19. The optical sense-control system according to claim 18, wherein a main value of the first waveband is defined as a wavelength of a corresponding first light with the highest intensity in the first light.

20. The optical sense-control system according to claim 18, wherein the first waveband is defined as a range of wavelengths corresponding to transmission ratios equal to or greater than 50% of the maximum transmission ratio of the lights capable of passing through the first-light filter.

21. The optical sense-control system according to claim 18, wherein a wavelength, corresponding to a first junction where the first-light filter and the second-light filter have a same transmission ratio to a same light, is located in the first waveband.

22. The optical sense-control system according to claim 18, wherein a wavelength, corresponding to a first junction where the first-light filter has a 30% of its maximum transmission ratio and the second-light filter has a 30% of its maximum transmission ratio to a same light, is located in the first waveband.

* * * * *